United States Patent [19]

Akasaka

[11] 4,173,404
[45] Nov. 6, 1979

[54] SHUTTER DIAL DEVICE FOR CAMERA
[75] Inventor: Shigeo Akasaka, Kodaira, Japan
[73] Assignee: Nippon Kogaku K.K., Tokyo, Japan
[21] Appl. No.: 851,678
[22] Filed: Nov. 15, 1977
[30] Foreign Application Priority Data Nov. 30, 1976 [JP] Japan ............................ 51-159240[U]

[51] Int. Cl.² ...................... G03B 17/18; G01D 13/00
[52] U.S. Cl. ..................................... 354/289; 116/213
[58] Field of Search .............................. 354/288, 289;
116/129 F, 129 N, 129 S, 114 J; 74/10, 41;
334/88

[56] References Cited
U.S. PATENT DOCUMENTS

| 2,090,390 | 8/1937 | Kuppenbender | 354/289 X |
| 3,185,064 | 5/1965 | Armbruster et al. | 354/289 X |
| 3,956,762 | 5/1976 | Miyamoto | 354/289 |
| 3,964,082 | 6/1976 | Mita | 354/289 |

Primary Examiner—Joseph W. Hartary
Assistant Examiner—Thomas H. Tarcza
Attorney, Agent, or Firm—Fitzpatrick, Cella, Harper & Scinto

[57] ABSTRACT

In a shutter dial device for camera having a shutter dial having a plurality of apertures for manual setting which are equal in diameter and formed on a circle centered at the rotary shaft of the shutter dial and a steel ball biased so as to be urged into each of the apertures, the apertures and the steel ball together constituting a click stop mechanism for manually setting the shutter speed, there is formed on the circle of the shutter dial an aperture for automatic setting having a diameter equal to or larger than the diameter of the steel ball, and a release member is provided on the shutter dial for stopping the steel ball in a position where the half or more of the steel ball drops into the aperture for automatic setting and for forcing back the steel ball out of the aperture for automatic setting by the manual operation.

2 Claims, 3 Drawing Figures

SHUTTER DIAL DEVICE FOR CAMERA

BACKGROUND OF THE INVENTION

1. Field of the Invention

This invention relates to a shutter dial device for camera.

2. Description of the Prior Art

There is known a type of shutter dial device which is provided with a click stop mechanism for turning the shutter dial and manually setting the shutter speed as desired and a fixing mechanism for firmly fixing the shutter dial and automatically setting the shutter speed.

In this device, however, the click stop mechanism and the fixing mechanism have been provided independently of each other and this has led to complexity of the mechanism.

SUMMARY OF THE INVENTION

It is an object of the present invention to eliminate the above-noted disadvantage and to provide a shutter dial device for camera which is simple in mechanism.

According to the present invention, the shutter dial device has a shutter dial having a plurality of apertures for manual setting which are equal in diameter and formed on a circle centered at the rotary shaft of the shutter dial and a steel ball biased so as to be urged into each of the apertures. The apertures and the steel ball together constitute a click stop mechanism for manually setting the shutter speed. An aperture for automatic setting is formed on the circle of the shutter dial and has a diameter equal to or larger than the diameter of the steel ball. A release member is provided on the shutter dial for stopping the steel ball in a position where half or more of the steel ball drops into the aperture for automatic setting and for forcing back the steel ball out of the aperture for automatic setting by manual operation. The release member provided on the shutter dial is slidable on the rotary shaft of the shutter dial and biased so as to stop the steel ball in the position where half or more of the steel ball drops into the aperture for automatic setting.

The invention will become more fully apparent from the following detailed description of an embodiment thereof taken in conjunction with the accompanying drawings.

DESCRIPTION OF THE PREFERRED EMBODIMENTS

Figure 2:
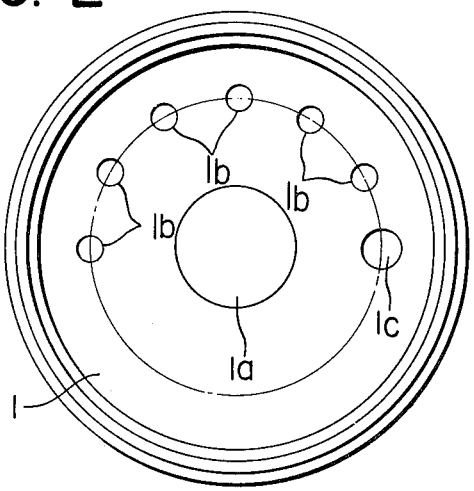
FIG. 2 is a bottom plan view of the shutter dial alone.

Referring to the drawings, a shutter dial 1 is rotatably provided on a camera body 2. The shutter dial 1, as is clearly shown in FIG. 2, has a plurality of small-diameter-apertures 1b for manual setting and a single large-diameter-aperture 1c for automatic setting which are all disposed on a circle centered at a rotary shaft 1a. A steel ball 3 is provided on the camera body 2 and biased so as to be urged into each of the apertures 1b. The diameter of each aperture 1b for manual setting is smaller than that of the steel ball 3, so that half or more of the steel ball can not drop into the aperture 1b. The steel ball 3 and the apertures 1b for manual setting together constitute a click stop mechanism for stopping the shutter dial 1 at each shutter speed. The diameter of the aperture 1c for automatic setting is equal to or larger than that of the steel ball 3 so that the steel ball 3 can drop into the aperture 1c. The steel ball 3 and the aperture 1c for automatic setting together constitute a fixing mechanism for firmly fixing the shutter dial 1. A release member 4 is rotatable with the shutter dial 1 and has an end portion 4a normally opposed to the aperture 1c for automatic setting. The said end portion 4a serves to stop the steel ball 3 in a position where the half or more of the steel ball 3 drops into the aperture 1c, as clearly shown in FIG. 3, and also serves to force back the steel ball 3 out of the aperture 1c by the manual operation.

Figure 1:
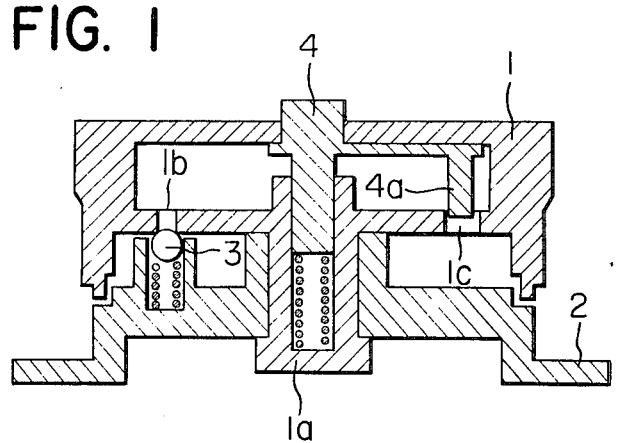
FIG. 1 is a cross-sectional view of the shutter dial device according to an embodiment of the present invention, in which the shutter speed is manually set.

Thus, as shown in FIG. 1, the steel ball 3, when opposed to one of the apertures 1b for manual setting, slightly drops into that aperture 1b, thereby one shutter speed is set. With rotation of the shutter dial 1, the steel ball 3 drops into successive ones of the aperture 1b for manual setting, namely, the shutter dial 1 is click-stopped, thereby each shutter speed is set.

Figure 3:
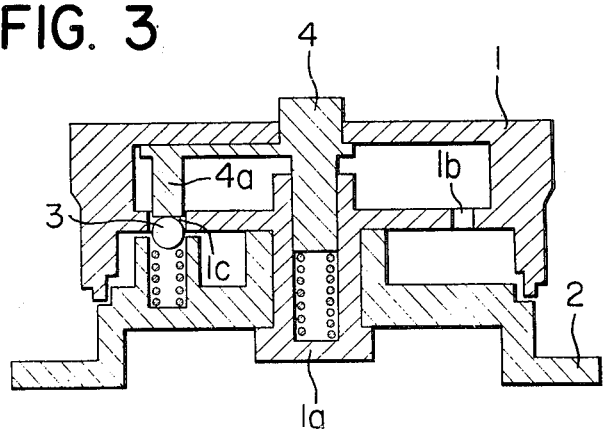
FIG. 3 is a cross-sectional view of the shutter dial device, in which the shutter speed is automatically set.

When the steel ball 3 is positioned to be opposed to the aperture 1c for automatic setting with rotation of the shutter dial 1, half or more of the steel ball 3 drops into the aperture 1c to make contact with the end portion 4a of the release member 4, as clearly shown in FIG. 3, whereby the shutter dial is stopped. Any further effort to rotate the shutter dial 1 could not force the steel ball 3 out of the aperture 1c and thus, the shutter dial becomes fixed. In this manner, the shutter speed is set to the automatic condition. Accordingly, irrespective of any aperture value being set, the shutter speed is automatically variable to enable photography to take place under proper exposure. Shift of the shutter speed from the automatic condition to the manual condition may be accomplished by manually depressing the release member 4 to force the steel ball 3 out of the aperture 1c for automatic setting and then turning the shutter dial 1.

According to the present invention, as hitherto described in detail, the apertures for manual setting provided on a circle centered at the rotary shaft and the steel ball on the camera body cooperate to click-stop the shutter dial in the conventional manner and in addition, the single aperture for automatic setting provided on said circle of the shutter dial may simply receive therein the half or more of the steel ball to firmly fix the shutter dial. This means a simplified mechanism and light-weight construction of the shutter dial device.

I claim:

1. A shutter dial device for a camera having a shutter dial having a plurality of apertures for manual setting which are equal in diameter and formed on a circle centered at the rotary shaft of the shutter dial and a steel ball biased so as to be urged into each of said apertures, said apertures and said steel ball together constituting a click stop mechanism for manually setting the shutter speed, the improvement comprising:

an aperture for automatic setting formed on said circle of said shutter dial and having a diameter equal to or larger than the diameter of said steel ball; and a release member provided on said shutter dial for stopping said steel ball in a position where half or more of said steel ball drops into said aperture for automatic setting and for forcing back said steel ball out of said aperture for automatic setting by manual operation.

2. A shutter dial device according to claim 1, wherein said release member is provided on said shutter dial for sliding movement on the rotary shaft of said shutter dial, and is biased so as to stop said steel ball in the position where half or more of the steel ball drops into said aperture for automatic setting.

* * * * *